US012680930B2

(12) United States Patent
Wang et al.

(10) Patent No.: US 12,680,930 B2
(45) Date of Patent: Jul. 14, 2026

(54) IN-SITU TESTING SYSTEM OF METAL MATERIALS UNDER HIGH TEMPERATURE AND COMPLEX LOADS

(71) Applicant: Zhejiang University, Hangzhou City (CN)

(72) Inventors: Jin Wang, Hangzhou (CN); Yongfeng Wang, Hangzhou (CN)

(73) Assignee: Zhejiang University, Hangzhou City (CN)

( * ) Notice: Subject to any disclaimer, the term of this patent is extended or adjusted under 35 U.S.C. 154(b) by 379 days.

(21) Appl. No.: 18/384,170

(22) Filed: Oct. 26, 2023

(65) Prior Publication Data

US 2025/0027859 A1     Jan. 23, 2025

(30) Foreign Application Priority Data

Jul. 19, 2023    (CN) .......................... 202310884608.4

(51) Int. Cl.
*G01N 3/18*        (2006.01)
*G01N 3/04*        (2006.01)
(Continued)

(52) U.S. Cl.
CPC ................. *G01N 3/18* (2013.01); *G01N 3/40* (2013.01); *G01N 3/04* (2013.01); *G01N 3/06* (2013.01);
(Continued)

(58) Field of Classification Search
CPC .. G01N 3/18; G01N 3/08; G01N 3/32; G01N 3/40; G01N 3/04; G01N 3/06; G01N 2203/0017; G01N 2203/0032; G01N 2203/0073; G01N 2203/0226; G01N 2203/0676; G01N 2203/0682;
(Continued)

(56) References Cited

U.S. PATENT DOCUMENTS

2013/0068034 A1*   3/2013   Takashima ........... G01B 11/162
73/800

FOREIGN PATENT DOCUMENTS

CN         101592573 B  *   2/2011
CN         102331370 A  *   1/2012
(Continued)

*Primary Examiner* — Jonathan M Dunlap
(74) *Attorney, Agent, or Firm* — Fresh IP PLC; Michael Anderson; Aubrey Y. Chen

(57)        ABSTRACT

The present disclosure provides an in-situ testing system of metal materials under high temperature and complex loads. The testing system includes a fatigue testing unit, a high-temperature loading unit, a signal detecting unit and a base. The fatigue testing unit is configured for pre-tightening a sample and then performing a fatigue testing on the sample. The high-temperature loading unit is configured for heating the sample to a high temperature. The signal detecting unit includes a pressure sensor and a displacement sensor. The pressure sensor is configured for monitoring the tensile force on the sample. The displacement sensor is configured for monitoring the displacement of the sample after being stretched during the pre-tightening of the sample. The base is configured for bearing the fatigue testing unit, the high-temperature loading unit and the signal detecting unit, and can be positioned on a scanning electron microscope stage or an open microscopic device.

9 Claims, 6 Drawing Sheets

(51) Int. Cl.
    *G01N 3/06*       (2006.01)
    *G01N 3/08*       (2006.01)
    *G01N 3/32*       (2006.01)
    *G01N 3/40*       (2006.01)

(52) U.S. Cl.
    CPC ................. *G01N 3/08* (2013.01); *G01N 3/32*
        (2013.01); *G01N 2203/0017* (2013.01); *G01N*
            *2203/0032* (2013.01); *G01N 2203/0073*
        (2013.01); *G01N 2203/0226* (2013.01); *G01N*
          *2203/0676* (2013.01); *G01N 2203/0682*
                          (2013.01)

(58) Field of Classification Search
    CPC ..... G01N 2203/0005; G01N 2203/005; G01N
             2203/0071; G01N 2203/0228; G01N
             2203/0423; G01N 2203/0482; G01N
                2203/0641; G01N 2203/0694
    See application file for complete search history.

(56)                References Cited

FOREIGN PATENT DOCUMENTS

| CN | 107703006 A | * | 2/2018 | ............... G01N 3/26 |
|----|-------------|---|--------|------------|
| CN | 108489812 A | * | 9/2018 | ............... G01N 3/08 |
| CN | 113514319 A | * | 10/2021 | ............... G01N 3/08 |
| DE | 102023100036 A1 | * | 7/2024 | ............... G01N 3/08 |
| EP | 3396353 A1 | * | 10/2018 | ............... G01N 3/42 |
| KR | 101374276 B1 | * | 3/2014 | ............... G01N 3/08 |

* cited by examiner

IN-SITU TESTING SYSTEM OF METAL MATERIALS UNDER HIGH TEMPERATURE AND COMPLEX LOADS

CROSS REFERENCE TO RELATED APPLICATION

This patent application claims the benefit and priority of Chinese Patent Application No. 202310884608.4, filed on Jul. 19, 2023, the disclosure of which is incorporated by reference herein in its entirety as part of the present application.

TECHNICAL FIELD

The present disclosure relates to the technical field of property testing of metal materials, in particular to an in-situ testing system of metal materials under high temperature and complex loads.

BACKGROUND

Researchers in scientific fields pay much attention to research on the comprehensive properties of advanced superalloy materials in aviation field, and the microscopic characteristics, morphology and distribution of materials directly affect various physical and chemical properties of materials. The traditional ex situ high-temperature mechanical property testing system platform and the microstructure characterization of materials are carried out independently, so the ex situ research method can lead to a serious lack of information on the microstructure evolution of materials during deformation, crack initiation and extension to fracture under high-temperature loading conditions, so it is impossible to comprehensively characterize and establish an analysis method and evaluation system with anti-fatigue, creep and tensile design for engineering structures.

Based on this, a novel in-situ testing system of metal materials under high temperature and complex loads is urgently needed to solve the above problems.

SUMMARY

The present disclosure aims to provide an in-situ testing system of metal materials under high temperature and complex loads, so as to solve the above problems in the prior art, and overcome the defect that material properties and microstructure evolution information in the traditional in-situ technology are inconsistent and realize the simultaneous mechanical-thermal coupling loading of metal materials.

In order to achieve the above objectives, the present disclosure provides the following scheme.

The present disclosure provides an in-situ testing system of metal materials under high temperature and complex loads, including:

a fatigue testing unit configured for pre-tightening a sample and then performing a fatigue testing on the sample;

a high-temperature loading unit configured for heating the sample to a high temperature;

a signal detecting unit including a pressure sensor and a displacement sensor; the pressure sensor is configured for monitoring a tensile force to which the sample is subjected; the displacement sensor is configured for monitoring a displacement of the sample after being stretched during the pre-tightening of the sample; and a base configured for bearing the fatigue testing unit, the high-temperature loading unit and the signal detecting unit; and the base is able to be positioned on a scanning electron microscope stage or an open microscopic device.

Preferably, the fatigue testing unit includes a sample clamping unit, a fatigue driving module and a mechanical pre-tightening unit.

The sample clamping unit includes a first clamping unit and a second clamping unit, the first clamping unit is configured for clamping a first end of the sample, and the second clamping unit is configured for clamping a second end of the sample.

The fatigue driving module includes a fatigue driving motor, a first transmission unit, an eccentric shaft assembly, a connecting rod and a bearing. The eccentric shaft assembly is rotatably arranged on the base. The fatigue driving motor is able to drive the eccentric shaft assembly to rotate through the first transmission unit. The first clamping unit is movably arranged on the base in a telescopic direction of the sample. A first end of the connecting rod is rotatably connected with an eccentric shaft section of the eccentric shaft assembly through the bearing, and a second end of the connecting rod is rotatably connected with the first clamping unit.

The mechanical pre-tightening unit includes a translation beam, a lead screw and a lead screw driving assembly. The translation beam is fixedly connected with the second clamping unit. The lead screw is rotatably installed on the base, and the lead screw is in threaded connection with the translation beam. The lead screw driving assembly is fixed on the base, and the lead screw driving assembly is configured for driving the lead screw to rotate.

Preferably, the lead screw driving assembly includes a transmission worm gear-worm device, a worm fixing shaft and a pre-tightening motor. The transmission worm gear-worm device includes a worm gear and a worm, the worm gear is coaxially fixed with the lead screw, the worm is coaxially fixed with the worm fixing shaft, and the worm gear is meshed with the worm. The worm fixing shaft is rotatably installed on the base, the pre-tightening motor is fixed on the base, and the worm fixing shaft is in transmission connection with an output shaft of the pre-tightening motor.

The lead screws includes two lead screws, the two lead screws are respectively located on two sides of the sample clamping unit and symmetrically arranged, and the translation beam is in threaded connection with the two lead screws simultaneously. The transmission worm gear-worm device comprises two transmission worm gear-worm devices, the worm fixing shaft is respectively in transmission connection with the two lead screws through the two transmission worm gear-worm devices.

The pre-tightening motor and the fatigue driving motor are both arranged perpendicular to and away from the sample.

Preferably, the eccentric shaft assembly includes an eccentric shaft body and an eccentric bushing. The eccentric shaft body is provided with two eccentric shaft sections. Geometric center lines of the two eccentric shaft sections are coincident. One eccentric shaft section with a circular section is a first eccentric shaft section, and another eccentric shaft section with a regular polygon section is a second eccentric shaft section.

The first eccentric shaft section is sleeved with the eccentric bushing, and the eccentric bushing is rotatable relative to the eccentric shaft body to realize adjustment of a total eccentric amount.

One end of the eccentric bushing is provided with a fixing sleeve. The fixing sleeve is sleeved on the second eccentric shaft section. A first threaded hole is formed in each of surfaces of the second eccentric shaft section. A second threaded hole is formed in the fixing sleeve. The fixing sleeve is fixed on the second eccentric shaft section through screws.

The bearing is an eccentric bearing, and the connecting rod is connected to an outer ring of the eccentric bearing through an opening and closing clasp ring.

Preferably, the first clamping unit includes a first upper clamping block, a first lower clamping block and a first clamping screw. The first upper clamping block is fixedly connected with the first lower clamping block through the first clamping screw. An upper surface of the first lower clamping block is provided with a first knurling boss. The first upper clamping block is arranged above the first knurling boss. The first upper clamping block is also provided with a knurling boss opposite to the first knurling boss. The first upper clamping block and the first lower clamping block are configured for clamping the first end of the sample.

The second clamping unit includes a second upper clamping block, a second lower clamping block and a second clamping screw. The second upper clamping block is fixedly connected with the second lower clamping block through the second clamping screw. An upper surface of the second lower clamping block is provided with a second knurling boss. The second upper clamping block is also provided with a knurling boss corresponding to the second knurling boss. The second upper clamping block is arranged above the second knurling boss. The second upper clamping block and the second lower clamping block are configured for clamping the second end of the sample.

First positioning holes are respectively formed in geometric centers of the first knurling boss and the second knurling boss. Second positioning holes corresponding to the first positioning holes are formed in the first upper clamping block and the second upper clamping block. Positioning pins are able to be inserted into the first positioning holes and the second positioning holes. A middle part of each of the positioning pins passes through a corresponding one of the first end and the second end of the sample.

Preferably, the high-temperature loading unit includes a heating power supply. The first clamping unit, the second clamping unit and the sample are all conductive. The heating power supply energizes the sample through the first clamping unit to realize self-heating of the sample. The first clamping unit is a negative electrode, the second clamping unit is a positive electrode, and the first clamping unit is grounded.

A screw rod is fixedly arranged on a side, away from the first lower clamping block, of the second lower clamping block. The screw rod extends through the translation beam. An end of the screw rod is in threaded connection with a fixing nut. The pressure sensor is arranged between the fixing nut and the translation beam. Insulating spacers are arranged between the pressure sensor and each of the second clamping unit, the translation beam and the fixing nut, the pressure sensor and the insulating spacers on both sides of the pressure sensor are able to be clamped between the fixing nut and the translation beam by screwing the fixing nut.

A water-cooling assembly and a ceramic plate are also provided. The water-cooling assembly abuts against one side of the ceramic plate, and another side of the ceramic plate abuts against the translation beam. The water-cooling assembly is configured for cooling the translation beam.

Preferably, the displacement sensor is a grating displacement sensor. The grating displacement sensor includes a reading head and a grating ruler. The reading head is fixed on a grating reading head fixing plate, one end of the grating reading head fixing plate is fixed on the translation beam, and the grating ruler is fixed on the base; alternatively, the reading head is fixed on the base, and the grating ruler is fixed on the translation beam.

Preferably, the-situ testing system also includes an infrared temperature measuring module. The infrared temperature measuring module is configured for measuring a temperature at a central observation point of the sample.

The infrared temperature measuring module includes an infrared temperature measuring probe and a three-way moving platform, the infrared temperature measuring probe is fixedly arranged on a moving end of the three-way moving platform, and the three-way moving platform is configured to drive the infrared temperature measuring probe to move in three directions. The infrared temperature measuring module is arranged right below the sample, and the infrared temperature measuring probe is able to directly face the sample to receive an infrared signal radiated by the sample or is able to receive an infrared signal radiated by the sample after being reflected by a plurality of reflectors.

Preferably, four legs are arranged at a bottom of the base. The base is rectangular and provided with a hollow middle part. Leveling fixing strips for height adjustment are installed on two opposite sides of an upper end face of the base. A countersunk hole configured for being connected to the scanning electron microscope stage or a platform of the open microscopic device is formed in each of the four legs.

Preferably, the-situ testing system also includes a heat shielding shell and a heat insulation insert board. The sample is covered with the heat shielding shell, an observation hole is formed in a top of the heat shielding shell, and the center observation point of the sample is observed through the observation hole.

Symmetrical rectangular holes are formed in the heat shielding shell. The heat insulation insert board passes through the two rectangular holes in turn and completes installation thereof. A through hole is formed in a middle part of the heat insulation insert board. An infrared light path of the infrared temperature measuring module reaches the sample through the through hole to realize temperature measurement of the sample.

The heat insulation insert board includes a plurality of heat insulation insert boards, and through holes in the heat insulation insert boards are all different in sizes.

Preferably, the heat shielding shell, the heat insulation insert boards and a heat shielding shell fixing plate are all conductors and communicated with each other. The heat shielding shell, the heat insulation insert boards and the heat shielding shell fixing plate are all electrically insulated from external equipment. Bias voltages are able to be applied to the heat shielding shell, the heat insulation insert boards and the heat shielding shell fixing plate to suppress hot electrons.

Preferably, the sample is narrow in a middle section and wide in two side sections, and the middle section and the two side sections are connected with transition arcs. The resistance of the sample is less than that of any one of the two lead screws arranged symmetrically.

Compared with the prior art, the present disclosure has the following technical effects.

Firstly, the in-situ testing system of metal materials under high temperature and complex loads provided by the present disclosure can be used for in-situ research on alloy phase transformation, service performance and microstructure evolution, thus overcoming the defect that information of material properties and microstructure evolution in the traditional in-situ technology is inconsistent.

Secondly, different from a large-scale commercial in-situ loading device, the in-situ testing system of metal materials under high temperature and complex loads provided by the present disclosure has a compact structure, portability and high control precision, and is compatible with mainstream scanning electron microscope platforms and high-spatial resolution microscopic imaging system devices, such as scanning electron microscopes, laser scanning confocal electron microscopes, X-ray diffractometers and other microscopic imaging systems with open object platforms.

Thirdly, the in-situ testing system of metal materials under high temperature and complex loads provided by the present disclosure includes a fatigue driving module, a mechanical pre-tightening unit, a water-cooling assembly, a high-temperature loading unit, a signal detecting unit, a heat shielding shell and an infrared temperature measuring module. The in-situ testing system has certain functional integration and is compatible with mainstream scanning electron microscopes and other microscopic devices, and can reveal the durable strength, tissue damage and material fracture failure of superalloy under high-temperature complex loads.

Fourthly, the sample is horizontally and laterally placed on the coaxial clamps for tensile loading. The clamps not only realize the basic function of conventional material mechanical loading testing, but also can be used for current heating. The two clamps are respectively provided with current leading-in ports. The second clamping unit is a positive electrode and the first clamping unit is a negative electrode. The sample is horizontally placed and clamped by the two clamps, and a loop is formed during electrification. The first clamping unit is grounded, so that the potential arrangement can improve the emission barrier of hot electrons, especially when the sample is heated to a high temperature and the microstructure of the sample material is imaged, the background interference signals brought by the hot electrons can be reduced, the limit resolution of the sample at a high temperature can be improved, and the images captured can be clearer.

Fifthly, the sample is covered with the heat shielding shell, and the observation hole is formed in the upper part of the heat shielding shell, so that an electron beam of the scanning electron microscope can be emitted to the sample. The higher the temperature of the sample heated by current, the greater the density of thermionic emission is, and the infrared light and visible light emitted by the sample at a high temperature are accompanied, both hot electrons and photons attenuate the imaging quality. The heat shielding shell has the functions of light shading, heat insulation and heat preservation of the sample, and the heat shielding shell is electrically insulated, so that the potential of the heat shielding shell is suspended. When hot electrons overflow at a high temperature, a bias voltage can be applied to the heat shielding shell to suppress the hot electrons, so that the imaging is clear during high-temperature heating, and the heat shielding shell can play a certain heat preservation role, thus reducing heat loss.

By setting the potential of the clamps, the metal sample placed on the clamps is grounded, and the potential barrier of thermionic emission is improved. When the temperature of the sample heated by current is higher, free electrons in the metal sample gain more energy, and some electrons cross the potential barrier to become hot electrons. The hot electrons crossing the potential barrier can be further suppressed by the bias voltages applied to the heat shielding shell, thus achieving the purpose of multi-layer filtering of hot electrons.

Sixthly, in the scanning electron microscope, the traditional contact heating method has a certain heat conduction path, so the heating efficiency is not high. Before the sample is heated, an indirect resistive heating body is heated firstly, but when the sample is heated at a high temperature, a large number of hot electrons are produced, thus affecting the high-temperature imaging quality. Moreover, for a long-term fatigue experiment, the sample is of a certain displacement during the reciprocating loading, and the sample is of certain friction with the contact surface in a contact heating. The microscopic contact surface conditions are changed at any time, but synchronous loading of the mechanical-thermal coupling cannot be achieved. Therefore, the sample clamps which can load current are adopted, and the potential arrangement on the clamps can suppress hot electrons at a high temperature, and the external heat shielding shell is used for secondary suppression, so that the effects that the synchronous loading of the mechanical-thermal coupling can image clearly are achieved.

Seventhly, when the sample is heated with current for a long time by the clamps, and Joule heat generated by the current is continuously conducted to peripheral important mechanical parts, especially when a force displacement signal detecting module is heated by the Joule heat to a higher temperature, failures can be caused. Therefore, a water-cooling assembly is installed on the translation beam near the pressure sensor and displacement sensor, and corresponding insulation measures are taken to prevent thermal loads and interference signals generated by the current flowing through the pressure sensor and displacement sensor from causing operation failure, thus ensuring the reliability of long-term operation.

Eighthly, the non-contact and non-destructive infrared temperature measurement method is adopted. When long-term in-situ high-temperature creep, tensile and fatigue experiments are carried out, with the increase of sample temperature, the traditional temperature measurement method of thermocouple welded on samples has certain limitations, especially during the high-frequency fatigue movement, the contact conditions of thermocouples are constantly changed, which may lead to the phenomenon of detachment and reduce the reliability of the temperature measurement method especially in the high-temperature stage. The present disclosure uses non-contact infrared temperature measurement and designs an infrared temperature measuring module suitable for the hardware of the system.

Ninthly, the fatigue driving module can apply reciprocating motion loads to the sample, and the arrangement of the eccentric shaft assembly and the eccentric bearing can realize the functions of multi-stage adjustable eccentric amount and expandable eccentric amount, thus realizing multi-stage strain control.

BRIEF DESCRIPTION OF THE DRAWINGS

To more clearly illustrate the embodiments of the present disclosure or the technical scheme in the prior art, the following briefly introduces the accompanying drawings to be used in the present embodiments. Apparently, the accompanying drawings in the following description show merely some embodiments of the present disclosure, and those skilled in the art may still derive other drawings from these accompanying drawings without creative efforts.

REFERENCE SIGNS

1, fatigue driving motor; 2, first transmission gear; 3, first support frame; 4, eccentric shaft body; 5, second support frame; 6, eccentric bushing; 7, opening and closing clasp ring; 8, pin; 9, circular flange bushing; 10, first fixing beam; 11, first lower clamping block; 12, lead screw support; 13, first current leading-in end; 14, first upper clamping block; 15, second upper clamping block; 16, positioning pin; 17, sample; 18, heat shielding shell; 19, heat insulation insert board; 20, heat shielding shell fixing plate; 21, second lower clamping block; 22, first electric insulation bushing; 23, translation beam; 24, water-cooling assembly; 25, water-cooling inlet; 26, water-cooling outlet; 27, ceramic plate; 28, sensor bushing; 29, pressure sensor; 30, second electric insulation bushing; 31, ceramic ring; 32, fixing nut; 33, pre-tightening motor; 34, third fixing mount; 35, second transmission gear; 36, worm fixing shaft; 37, worm gear; 38, worm; 39, lead screw; 40, fourth fixing mount; 41, limiting switch; 42, first main fixing seat; 43, grating ruler; 44, grating reading head fixing plate; 45, reading head; 46, first infrared fixing nut; 47, second infrared fixing nut; 48, second heat shielding cover; 49, infrared fixing plate; 50, leveling fixing strip; 51, first insulating block; 52, infrared temperature measuring probe; 53, eccentric bearing; 54, positioning pin hole; 55, first clamping screw; 56, first knurling boss; 57, infrared front threaded sleeve; 58, bevel cylinder; 59, infrared light path; 60, reflector; 61, second main fixing seat; 62, first moving plate; 63, second moving plate; 64, infrared fixing moving frame; 65, sliding chute; 66, base; 67, base lug; 68, second insulating block; 69, second lead screw support; and 70, ceramic block.

DETAILED DESCRIPTION OF THE EMBODIMENTS

The following clearly and completely describes the technical scheme in the embodiments of the present disclosure with reference to the accompanying drawings in the embodiments of the present disclosure. Apparently, the described embodiments are merely a part rather than all of the embodiments of the present disclosure. Based on the embodiments in the present disclosure, all other embodiments obtained by persons skill in the art without creative effort belong to the scope of the present disclosure.

The present disclosure aims to provide an in-situ testing system of metal materials under high-temperature complex loads so as to solve the above problems in the prior art, and overcome the defect that material properties and microstructure evolution information in the traditional in-situ technology are inconsistent and realize the simultaneous mechanical-thermal coupling loading of metal materials.

To make the foregoing objectives, features and advantages of the present disclosure clearer and more comprehensible, the present disclosure is further described in detail below with reference to the accompanying drawings and specific embodiments.

Figure 1:
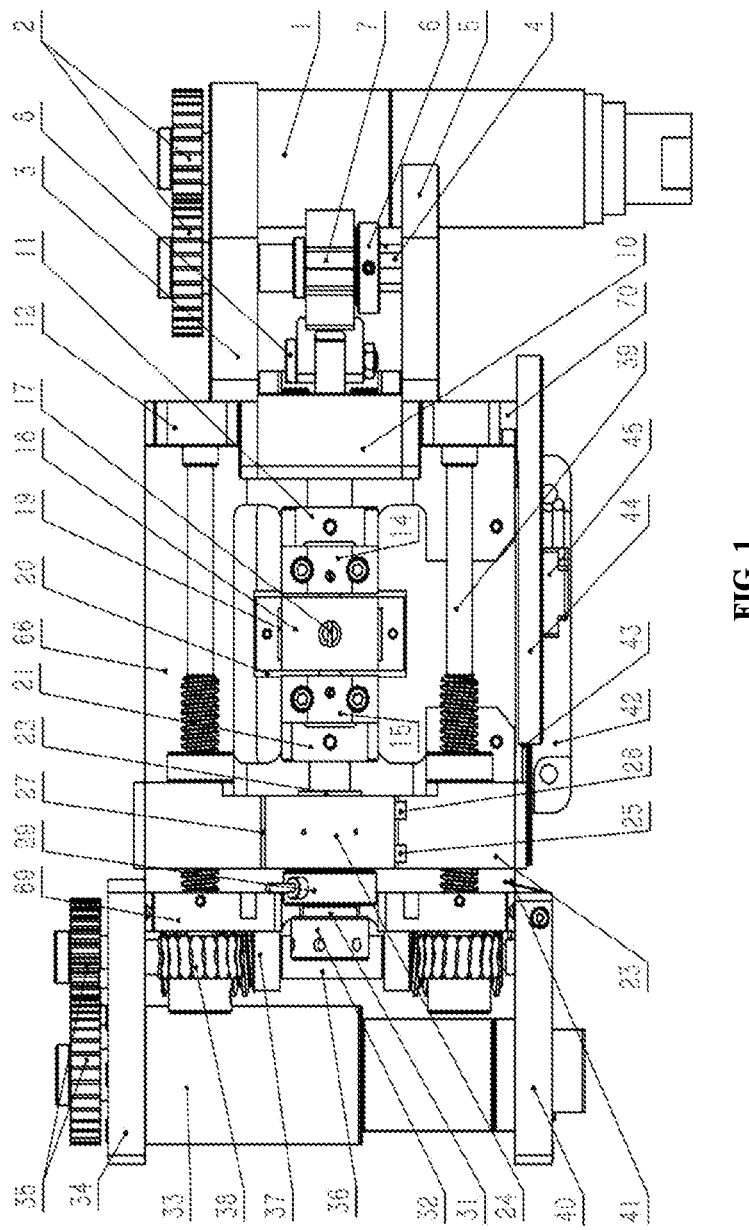
FIG. 1 is an integral structural schematic diagram of an in-situ testing system of metal materials under high temperature and complex loads provided by the present disclosure.
Figure 2:
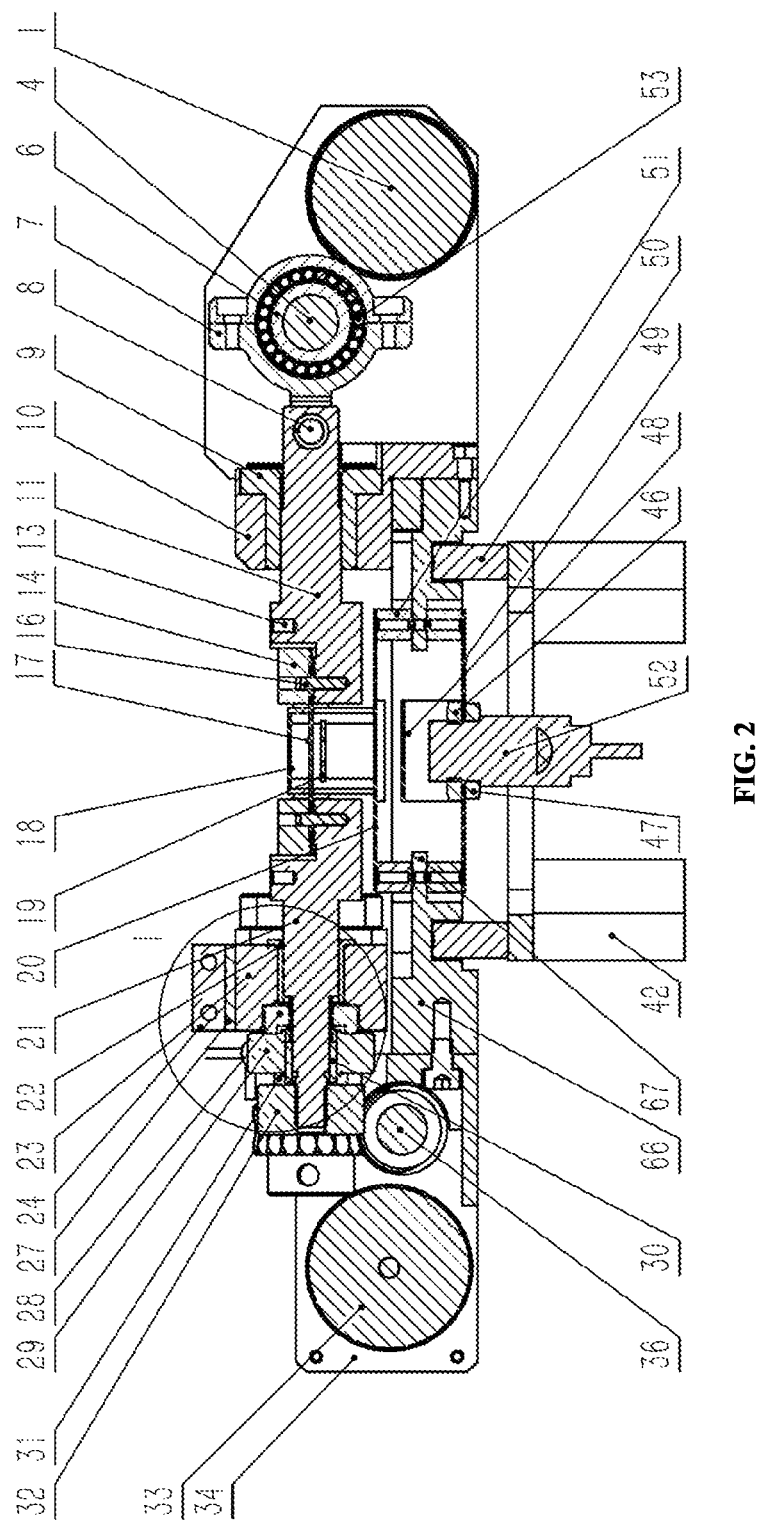
FIG. 2 is a sectional view of FIG. 1.

The present disclosure provides an in-situ testing system of metal materials under high temperature and complex loads (hereinafter referred to as a testing system), as shown in FIG. 1 and FIG. 2, including a fatigue testing unit, a high-temperature loading unit, a signal detecting unit and a base 66.

The fatigue testing unit is configured for pre-tightening a sample 17 and then performing a fatigue testing.

Specifically, the fatigue testing unit includes a sample clamping unit, a fatigue driving module and a mechanical pre-tightening unit.

The sample clamping unit includes a first clamping unit and a second clamping unit, the first clamping unit is configured for clamping a first end of the sample 17, and the second clamping unit is configured for clamping a second end of the sample 17.

The fatigue driving module includes a fatigue driving motor 1, a first transmission unit, an eccentric shaft assembly, a connecting rod and a bearing. The eccentric shaft assembly is rotatably arranged on the base 66. The fatigue driving motor 1 can drive the eccentric shaft assembly to rotate by means of the first transmission unit. The first clamping unit is movably arranged on the base 66 in the telescopic direction of the sample 17. A first end of the connecting rod is rotatably connected with an eccentric shaft section of the eccentric shaft assembly by means of the bearing, and a second end of the connecting rod is rotatably connected with the first clamping unit.

The mechanical pre-tightening unit includes a translation beam 23, a lead screw 39 and a lead screw driving assembly. The translation beam 23 is fixedly connected with the second clamping unit. The lead screw 39 is rotatably installed on the base 66, and the lead screw 39 is in threaded connection with the translation beam 23. The lead screw driving assembly is fixed on the base 66, and the lead screw driving assembly is configured for driving the lead screw 39 to rotate.

When in use, the sample 17 is pre-tightened by the mechanical pre-tightening unit, and then the sample 17 is repeatedly stretched by the fatigue driving module.

Figure 3:
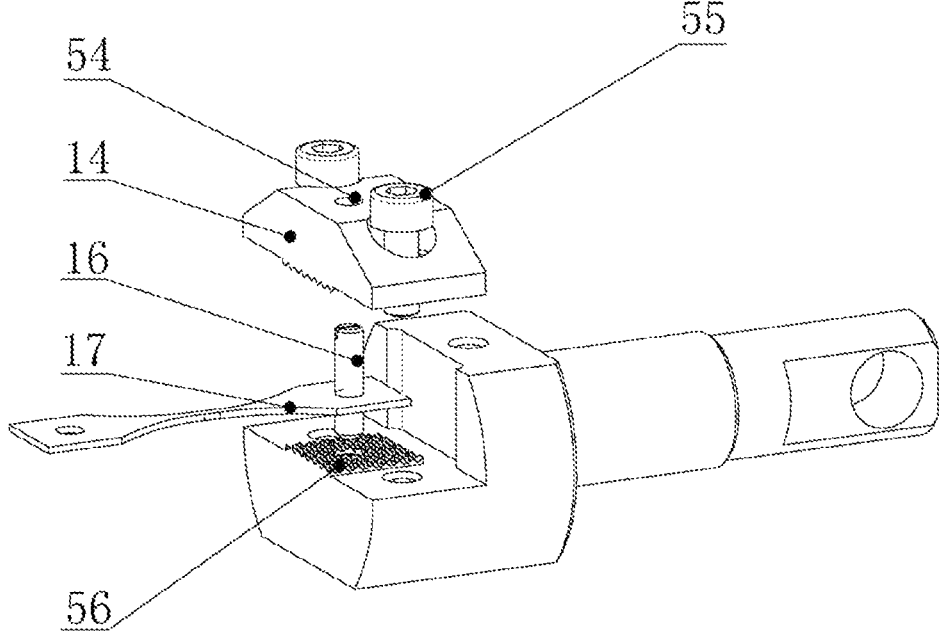
FIG. 3 is a structural schematic diagram of a first clamping unit.

As shown in FIG. 3, the first clamping unit includes a first upper clamping block 14, a first lower clamping block 11 and first clamping screws 55. The first upper clamping block 14 and the first lower clamping block 11 are fixedly connected by means of the first clamping screws 55. An upper surface of the first lower clamping block 11 is provided with a first knurling boss 56. An lower surface of the first upper clamping block is also provided with a knurling boss opposite to the first knurling boss 56 of the first lower clamping block. The first upper clamping block 14 is arranged above the first knurling boss 56. The first upper clamping block 14 and the first lower clamping block 11 are configured for clamping the first end of the sample 17.

The second clamping unit includes a second upper clamping block 15, a second lower clamping block 21 and second clamping screws. The second upper clamping block 15 and the second lower clamping block 21 are fixedly connected by means of the second clamping screws. An upper surface of the second lower clamping block 21 is provided with a second knurling boss. An lower surface of the second upper clamping block 15 is also provided with a knurling boss opposite to the second knurling boss of the second lower clamping block 21. The second upper clamping block 15 is arranged above the second knurling boss. The second upper clamping block 15 and the second lower clamping block 21 are configured for clamping the second end of the sample 17.

A positioning pin hole 54 is formed in each of the first upper clamping block 14 and the second upper clamping block 15. Corresponding positioning holes are formed in the second lower clamping block 21 and the first lower clamping block 11. Positioning pins 16 are inserted in the positioning pin holes 54 and the positioning holes to position the first upper clamping block 14, the second upper clamping block 15 and the sample 17.

The high-temperature loading unit is configured for heating the sample 17 at a high temperature.

Specifically, the high-temperature loading unit includes a heating power supply. The first clamping unit, the second clamping unit and the sample 17 are all conductive. The heating power supply energizes the sample 17 by means of the first clamping unit to realize self-heating of the sample 17. The first clamping unit is a negative electrode, the second clamping unit is a positive electrode, and the first clamping unit is grounded.

The first clamping unit and the second clamping unit are both provided with current leading-in ends. Specifically, threaded holes or clamping holes are formed in the first clamping unit and the second clamping unit. Electrodes of the heating power supply are connected into the threaded holes or clamping holes, so that the purpose of introducing current to the first clamping unit and the second clamping unit can be realized.

A signal detecting unit includes a pressure sensor 29 and a displacement sensor. The pressure sensor 29 is configured for monitoring the tensile force on the sample 17. The displacement sensor is configured for monitoring the displacement of the sample 17 after being stretched during the pre-tightening of the sample.

Specifically, a screw rod is fixedly arranged on the side, away from the first lower clamping block 11, of the second lower clamping block 21. The screw rod extends through the translation beam 23. The end of the screw rod is in threaded connection with a fixing nut 32. The pressure sensor 29 is arranged between the fixing nut 32 and the translation beam 23. Insulating spacers are arranged between the pressure sensor 29 and the second clamping unit, the translation beam 23 and the fixing nut 32. The pressure sensor 29 and the insulating spacers on both sides thereof can be clamped between the fixing nut 32 and the translation beam 23 by screwing the fixing nut 32.

The base 66 is configured for bearing the fatigue testing unit, the high-temperature loading unit and the signal detecting unit. The base 66 can be positioned on a scanning electron microscope stage or an open microscopic device.

Specifically, four legs are arranged at the bottom of the base 66. The base is rectangular and provided with a hollow middle part. Leveling fixing strips 50 for adjusting the height can be installed on two opposite sides of an upper surface of the base 66. A countersunk hole for being connected to the scanning electron microscope stage or a platform of the open microscopic device is formed in each leg.

The operating principle of the testing system is as follows.

When in use, the first end of the sample 17 is clamped by the first clamping unit, and the second end of the sample 17 is clamped by the second clamping unit. Then, the second clamping unit is moved away from the first clamping unit by the mechanical pre-tightening unit to realize the pre-tightening of the sample 17. During the pre-tightening of the sample 17, the movement of the second clamping unit is stopped when the pressure sensor 29 detects that the tensile force on the sample 17 exceeds a set threshold. Then, current is introduced into the sample 17 to realize self-heating of the sample 17, and an eccentric shaft driving assembly is turned on. When the eccentric shaft assembly rotates, the eccentric shaft assembly drives the first clamping unit to reciprocate on the base 66 along a straight line via the connecting rod, thereby loading the sample 17 with certain frequency in a reciprocating manner. After a certain period of time, the mechanical properties of the sample 17 can be analyzed by observing and recording the surface morphology of the sample 17 with the scanning electron microscope or the open microscopic device. By transmitting data monitored by the pressure sensor 29 and the displacement sensor to the upper computer in real time, S-N curve, endurance limit, stress-strain hysteresis loop and other mechanical characteristics capable of characterizing the mechanical properties of the material of the sample 17 can also be obtained by software installed in the upper computer.

In addition, when the first clamping unit reciprocates, the rotating direction of the eccentric shaft assembly is unchanged, that is, the driving motor of the eccentric shaft driving assembly does not need to change the rotating direction, so that the first clamping unit does not bear the impact caused by the change of the rotating direction, and the loading frequency is improved in the loading process.

Figure 4:
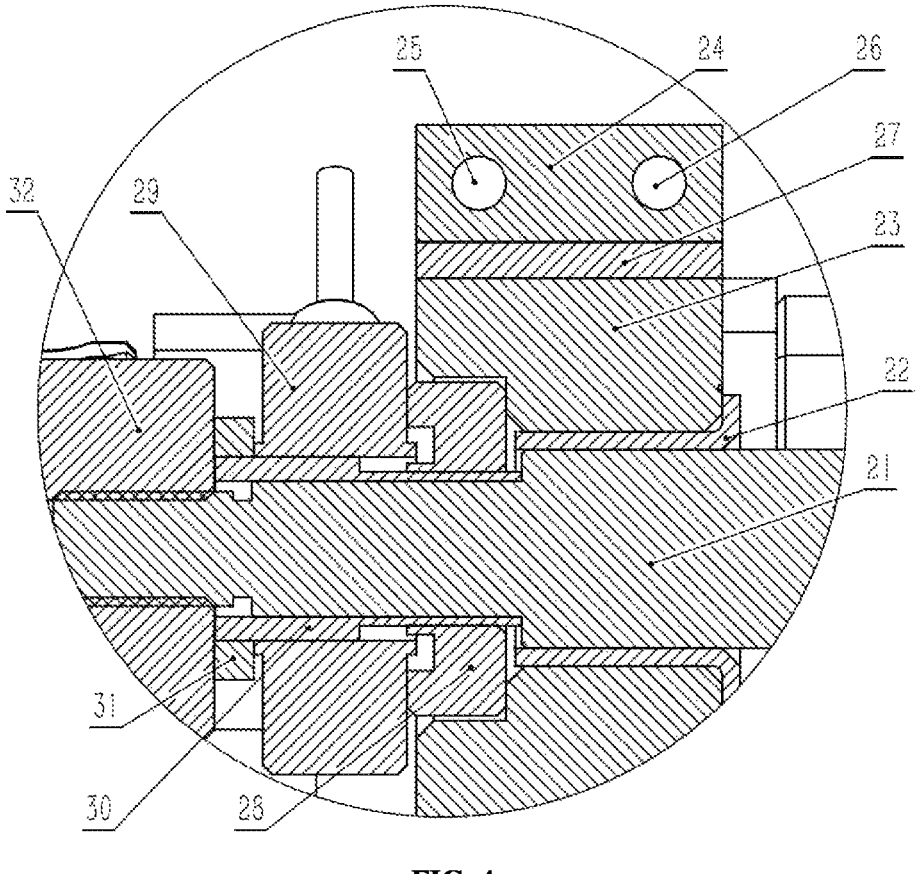
FIG. 4 is a structural schematic diagram of a pressure sensor, and an insulation structure and a cooling assembly around the pressure sensor.

In some embodiments, as shown in FIG. 4, a water-cooling assembly 24 and a ceramic plate 27 are also arranged. The water-cooling assembly 24 abuts against one side of the ceramic plate 27, and the other side of the ceramic plate 27 abuts against the translation beam 23. The water-cooling assembly 24 can cool the translation beam 23.

Corresponding threaded holes are formed in the water-cooling assembly 24 and the ceramic plate 27. The water-cooling assembly 24 and the ceramic plate 27 can be fixed on the translation beam 23 by screws, wherein a U-shaped water-cooling channel is formed in the water-cooling assembly 24. The water-cooling assembly 24 is composed of a water-cooling inlet 25 and a water-cooling outlet 26 to form a water-cooling loop, thus preventing the failure of related key equipment caused by high temperature due to the in-situ testing is performed for a long time.

In some embodiments, the lead screw driving assembly includes a worm gear 37, a worm 38, a worm fixing shaft 36 and a pre-tightening motor 33. The worm gear 37 is coaxially fixed with the lead screw 39, the worm 38 is coaxially fixed with the worm fixing shaft 36, and the worm gear 37 is meshed with the worm 38. The worm fixing shaft 36 is rotatably installed on the base 66, the pre-tightening motor 33 is fixed on the base 66, and the worm fixing shaft 36 is in transmission connection with an output shaft of the pre-tightening motor 33.

There are two lead screws 39. The two lead screws 39 are respectively located on two sides of the sample clamping unit and symmetrically distributed. The translation beam 23 is simultaneously connected with the two lead screws 39 by threads. The worm fixing shaft 36 is respectively in transmission connection with the two lead screws 39 via the two transmission devices each including the worm gear 37 and the worm 38.

The pre-tightening motor 33 and the fatigue driving motor 1 are both arranged perpendicular to the sample, and the pre-tightening motor 33 and the fatigue driving motor 1 are both arranged away from the sample, so that they keep away from the sample in a high-temperature to avoid negative influence of a high-temperature environment on the motors.

The embodiment provides a specific implementation of the lead screw driving assembly. In other embodiments, two or more lead screws or one lead screw may be provided to drive the translation beam 23 to move.

In some embodiments, the eccentric shaft assembly includes an eccentric shaft body 4 and an eccentric bushing 6. The eccentric shaft body 4 includes two eccentric shaft sections. The geometric centers of the two eccentric shaft sections are coincident. One eccentric shaft section with a circular section is a first eccentric shaft section, and the other eccentric shaft section with a regular polygon section is a second eccentric shaft section.

The eccentric bushing 6 is sleeved on the first eccentric shaft section, and the eccentric bushing 6 can rotate relative to the eccentric shaft body 4 to realize the adjustment of total eccentric amount. A regular polygon is specifically a regular nonagon, and the words of serial numbers 1 to 9 are marked on nine faces of the second eccentric shaft section in turn, so that the total eccentric amount of the eccentric shaft body 4 and the eccentric bushing 6 is adjustable, and the eccentric bushing 6 can be fixed in the circumferential direction relative to the eccentric shaft body 4. Different circumferential fixing gears correspond to different output eccentric amounts, thus realizing a nine-gear adjustment function of eccentric amount.

One end of the eccentric bushing 6 is provided with a fixing sleeve. The fixing sleeve is sleeved on the second eccentric shaft section. A first threaded hole is formed in each surface of the second eccentric shaft section. A second threaded hole is formed in the fixing sleeve. The fixing sleeve is fixed on the second eccentric shaft section by screws. A threaded hole may be not formed in the second eccentric shaft section, but only a second threaded hole is formed in the fixing sleeve, and the fixing sleeve is fixed by screwing a jackscrew into the second threaded hole.

In addition, in order to widen the adjustable range of the eccentric amount, the bearing is an eccentric bearing 53. The purpose of further adjusting the eccentric amount is realized by replacing the eccentric bearings 53 of different specifications. The connecting rod is connected to an outer ring of the eccentric bearing 53 by means of an opening and closing clasp ring 7. The connecting rod is connected with the first clamping unit through a pin 8 to form a rotating pair.

In the embodiment, the eccentric shaft assembly and the eccentric bearing 53 are arranged in such a manner that the eccentric amount can be adjusted in multiple stages and the eccentric amount can be expanded, thereby realizing multistage strain control.

In some embodiments, the displacement sensor is a grating displacement sensor. The grating displacement sensor includes a reading head 45 and a grating ruler 43. The reading head 45 is fixed on a grating reading head fixing plate. One end of the grating reading head fixing plate is fixed on the translation beam 23, and the grating ruler 43 is fixed on the base 66; alternatively, the reading head 45 is fixed on the base 66, and the grating ruler 43 is fixed on the translation beam 23.

Specifically, in order to realize the electrical insulation and thermal insulation of the displacement sensor on the premise that the basic function of the displacement sensor can be realized and ensure reliable long-time operation in an electric heating mode, a ceramic block 70 is arranged between the grating displacement sensor and the translation beam 23 to avoid direct contact between the grating displacement sensor and the translation beam 23, and the other part of the grating displacement sensor is fixed on a first fixing beam 10, and a ceramic block 70 is also arranged between the grating displacement sensor and the first fixing beam 10.

In some embodiments, the testing system also includes an infrared temperature measuring module. The infrared temperature measuring module is configured for measuring the temperature at a central observation point of the sample 17.

The infrared temperature measuring module includes an infrared temperature measuring probe 52 and a three-way moving platform. The infrared temperature measuring probe 52 is fixedly arranged on a moving end of the three-way moving platform. The three-way moving platform can carry the infrared temperature measuring probe 52 to move in three directions. The infrared temperature measuring module is arranged right below the sample 17. The infrared temperature measuring probe 52 can directly face the sample 17 to receive an infrared signal radiated by the sample 17 or can also receive an infrared signal radiated by the sample 17 after being reflected by a plurality of reflectors 60.

Figure 5:
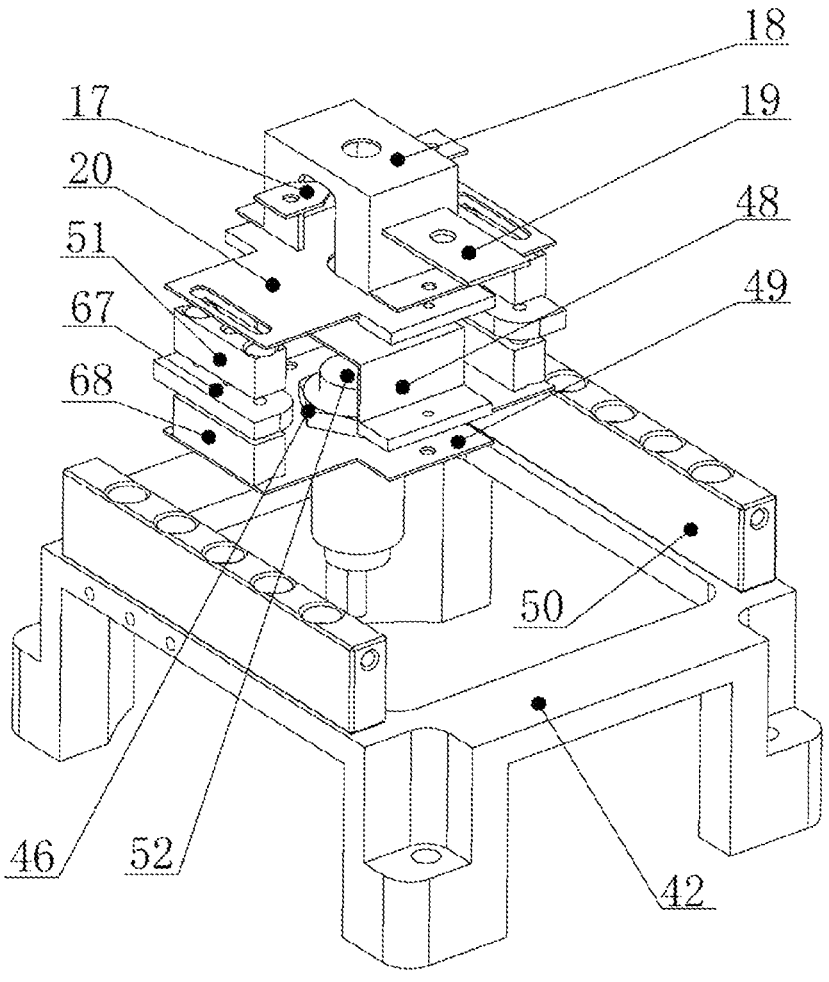
FIG. 5 is a structural schematic diagram of a heat shielding shell and an infrared temperature measuring module.
Figure 6:
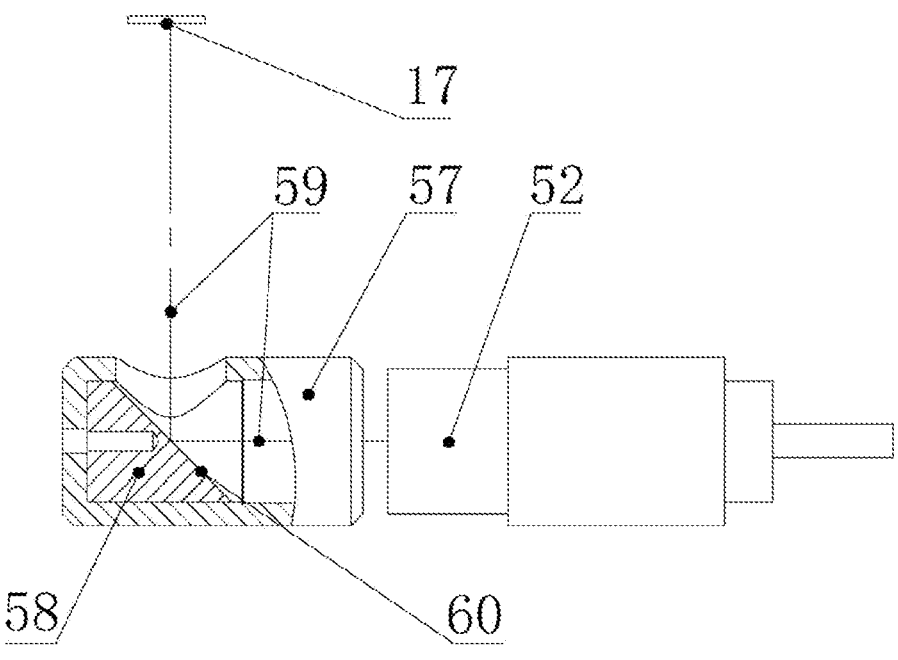
FIG. 6 is a schematic assembly diagram of an infrared temperature measuring probe with a front reflector.
Figure 7:
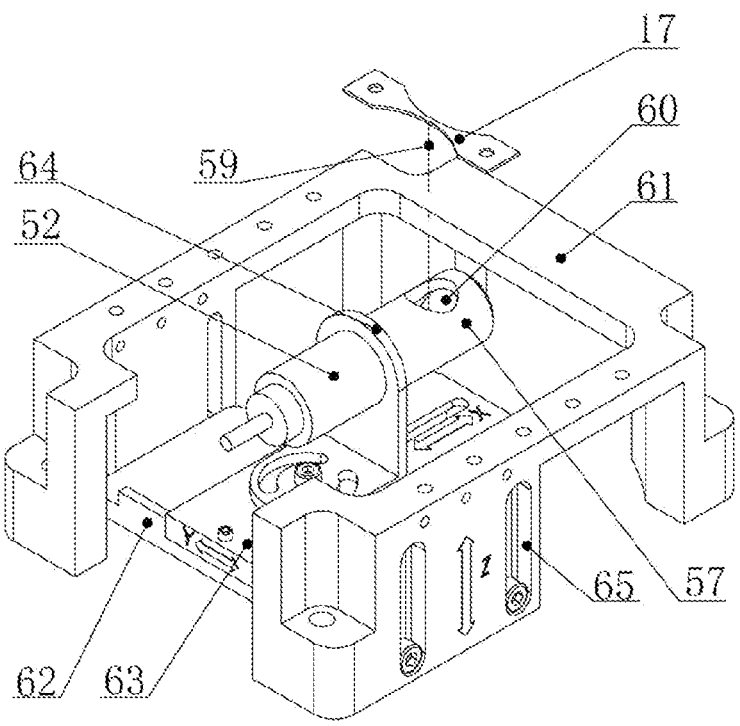
FIG. 7 is an assembly diagram of a three-way moving platform and an infrared temperature measuring module with a front reflector.

As shown in FIG. 5 to FIG. 7, the infrared temperature measuring module can be divided into two types according to horizontal placement and vertical placement of the infrared temperature measuring probe 52. When the infrared temperature measuring probe 52 is placed vertically, the first type of temperature measuring module includes a first main fixing seat 42, a first infrared fixing nut 46, a second infrared fixing nut 47, a second heat shielding cover 48, an infrared fixing plate 49, leveling fixing strips 50, a first insulating block 51 and an infrared temperature measuring probe 52.

When the infrared temperature measuring probe 52 is placed horizontally, the second type of temperature measuring module includes a second heat shielding cover 48, an infrared fixing plate 49, leveling fixing strips 50, a first insulating block 51, an infrared temperature measuring probe 52, an infrared front threaded sleeve 57, a bevel cylinder 58, an infrared light path 59, a reflector 60, a second main fixing seat 61, a first moving plate 62, a second moving plate 63, and an infrared fixing moving frame 64.

Two ends of the sample 17 are clamped by clamps with an electric heating effect to form a current loop, so that the sample 17 is heated to a high-temperature stage. The infrared temperature measuring probe 52 in the first type of temperature measuring module is vertically placed right below the sample 17 to monitor the temperature of the sample 17. A circular hole of a certain size is formed in the nearest heat shielding shell fixing plate 20 placed right below the sample 17 for the purpose that the infrared light path of the infrared temperature measuring probe 52 is not be blocked and a certain effect of shielding light and heat insulation can be realized. In order to further protect the infrared temperature measuring probe 52 from being damaged by the thermal radiation of the sample 17, a second heat shielding cover 48 is arranged right above one end of the infrared temperature measuring probe 52. A circular hole of a certain size is also formed in the second heat shielding cover 48 for the purpose that the infrared light path is not be blocked and playing a role in heat insulation. The infrared fixing plate 49 is located right below the second heat shielding cover 48 for fixing and rigidly supporting the second heat shielding cover 48. A hole in clearance fit with a threaded section at the front end of the infrared temperature measuring probe 52 is formed in the infrared fixing plate 49. The first infrared fixing nut 46 and the second infrared fixing nut 47 are respectively located right above and below the circular hole of the infrared fixing plate 49. The first infrared fixing nut 46 and the second infrared fixing nut 47 are connected by means of the threaded section at the front end of the infrared temperature measuring probe 52, so as to fixedly press the infrared temperature measuring probe 52 on the infrared fixing plate 49. First insulating blocks 51 are respectively arranged right above both ends of the infrared fixing plate 49, and both ends of the infrared fixing plate 49, the first insulating blocks 51 and base lugs 67 are insulated and fixed together by ceramic screws. The first main fixing base 42 is installed on the first type of temperature measuring module (the infrared temperature measuring probe 52 is vertically placed). The first main fixing base 42 is a base 66 for bearing and positioning which has a rectangular hole in the middle and is supported at four corners. The leveling fixing strips 50 in pairs are symmetrically arranged on the opposite side frames of the upper surface of the first main fixing base 42. A countersunk hole is formed in the vertical direction of the leveling fixing strip 50, and the leveling fixing strip 50 is fixed to the first main fixing seat 42 by screws. The base 66 is located right below the leveling fixing strips 50, and two parallel rectangular grooves for inserting and mounting the leveling fixing strips 50 are formed in the base 66 for bearing and positioning. A threaded hole for fixedly connecting the base 66 is formed in one end of the leveling fixing strip 50 in the horizontal direction.

The infrared temperature measuring probe 52 in the second type of temperature measuring module is horizontally placed. The infrared temperature measuring probe 52 is equipped with an infrared front threaded sleeve 57, and the front end of the infrared temperature measuring probe 52 is connected with the infrared front threaded sleeve 57 by threads. The bevel cylinder 58 is embedded in the bottom end of the infrared front threaded sleeve 57, and threaded holes for the fixed connection between the bevel cylinder 58 and the infrared front threaded sleeve 57 are formed in both the center of the cylindrical end face of the bevel cylinder 58 and the center of the bottom end face of the infrared front threaded sleeve 57. A silver film is plated on the bevel elliptical surface of the bevel cylinder 58 to act as a reflector 60. The bevel elliptical surface of the bevel cylinder 58 is at a 45-degree angle from the horizontal plane, so that the infrared temperature measuring probe 52 can receive the infrared signal reflected by the reflector 60 and the reflector 60 is located right below a middle gauge section of the sample 17. When the sample 17 is heated to a high temperature, the infrared light path 59 received by the infrared temperature measuring probe 52 placed horizontally is approximately L-shaped. The front end threads of the infrared temperature measuring probe 52 extends through the circular hole of the infrared fixing moving frame 64 to be in threaded connection with the internal threads of the infrared front threaded sleeve 57, so that the infrared temperature measuring probe 52 and the infrared front threaded sleeve 57 are horizontally installed and fixed on the infrared fixing moving frame 64. The infrared fixing moving frame 64 is an L-shaped metal plate in appearance. The lower end face of the L-shaped metal plate, namely the infrared fixing moving frame 64, is circular. The lower end face of the L-shaped metal plate is fixed with the first moving plate 62 by bolts. A sliding chute 62 is formed in the first moving plate 62 in the length direction thereof, so that the infrared fixing moving frame 64 can slide back and forth in X direction. The second moving plate 63 is placed on the third moving plate to be matched with the sliding chute 65, so that the second moving plate 63 can move back and forth in Y direction. The third moving plate and the inner wall of the second main fixing seat 61 keep clearance fit, so that the third moving plate can be horizontally placed in up and down direction. Two sliding chutes 65 with the same shape and size are respectively formed in the symmetrical end faces of the second main fixing seat 61, and the horizontal fixing and up-and-down movement of the third moving plate, namely the movement in Z direction, are realized by means of inner hexagon screws. The infrared temperature measuring probe 52 can be placed transversely based on that the infrared light path 59 can be refracted by the reflector 60, so that the infrared temperature measuring probe 52 is protected as much as possible. The infrared temperature measuring probe 52 can move in three directions of X, Y and Z, so that the monitored sample 17 can be placed on the infrared light path 59. At the same time, the focusing point of the initial infrared light path 59 can be adjusted to fall on the sample 17, thus improving the accuracy of temperature measurement, protecting the infrared temperature measuring probe 52 to work reliably for a long time and prolonging the service life at the high temperature. In addition, the first main fixing seat 42 and the second main fixing seat 61 for bearing and positioning can be compatible with the mainstream scanning electron microscope platform, and are characterized by four supporting legs. The upper end faces of the four supporting legs are hollowed out, the opposite sides of the first main fixing seat 42 and the second main fixing seat 61 can be equipped with the leveling fixing strips 50 for adjusting height and bearing. A countersunk hole for fixing the moving platform of the mainstream scanning electron microscope moving platform is formed in each supporting leg.

Of course, the movement of the infrared temperature measuring probe 52 can be realized in three directions of X, Y and Z by using any three-way mobile platform in the prior art.

The infrared temperature measuring module needs to calibrate the temperature of the high-temperature alloy sample 17 to be researched before the experiment in the actual use process. For example, when the high-temperature tensile performance of Inconel 718 alloy at 650° C. is researched, the first type of temperature measuring module (the infrared temperature measuring probe 52 is vertically placed) and the second type of temperature measuring module (the infrared temperature measuring probe 52 is horizontally placed) on the hardware are both applicable. Taking the first type of temperature measuring module as an example, the infrared temperature measuring probe 52 in the present disclosure is a monochrome non-focusing infrared thermometer, which is small in size, space-saving and high in temperature measuring accuracy and sensitivity, and also can be suitable for temperature measurement in a vacuum environment for a long time, so that it can be used as a temperature measuring device of an in-situ system platform for long-time high-temperature complex load testing. The middle gauge section of the 718 sample is selected as the observation point. A thermocouple with a diameter of 0.1 mm is welded at the central position of the middle gauge section on the upper surface of the sample 17. The infrared temperature measuring probe 52 below the sample 17 directly faces the central position of the gauge section on the lower surface of the sample 17. The 718 plate-shaped sample 17 with a thickness of 0.3 mm to 0.7 mm is used for the testing. The upper computer controls the pre-tightening motor 33 to keep the clamps at a small constant force, and the heating power supply with external direct current is turned on to introduce current to the clamps via drainage wires, so that the clamps at both ends and the sample 17 form a series loop to heat the sample 17. The key to select the shape of the sample 17 to be heated is that the middle section thereof is relatively thin. The current is continuously increased until the temperature detected by the thermocouple is 650° C. and kept for a period of time. The current is controlled through PID (Proportional-Integral-Derivative) until the temperature reaches 650° C. in a steady state, and the infrared temperature measurement also displays an indication. The infrared temperature is compensated to 650° C. which is the temperature value of the thermocouple by adjusting the infrared emission coefficients, the infrared emission coefficient value R1 adjusted for the material at the temperature of 650° C. is recorded, and then the infrared emission coefficients adjusted for compensation at different temperatures can be recorded. A new sample 17 obtained by processing the same material under the same process is placed right above the infrared temperature measuring probe 52 to replace the sample 17 previously used for infrared calibration. At this time, infrared temperature measurement is directly adopted without welding thermocouples. Before preparing to apply current, the infrared emission coefficient is adjusted to R1 in advance, and then the upper computer is turned on to communicate with the external direct-current power supply equipment. The current is continuously increased through the upper computer until the infrared temperature is displayed to be 650° C., and the temperature at the temperature measuring point of the sample 17 is stabilized at 650° C. in real time by means of the PID. If the sample 17 needs to be performed the tensile, creep and fatigue testing, the infrared emission coefficient can be calibrated firstly with the method, and then the temperature is accurately controlled during the testing by means of the PID to research the mechanical properties and corresponding microstructure changes of the material at different temperatures, so as to research the failure mechanism of the material.

In the embodiment, the infrared temperature measuring module for testing samples with focused or non-focused points can replace the temperature measuring mode of a damaged sample surface by thermocouple contact welding. During the testing, thermocouple welding is not needed, and the purpose of accurate infrared temperature measurement can be achieved.

In some embodiments, the testing system also includes a heat shielding shell 18 and a heat insulation insert board 19. The sample 17 is covered with the heat shielding shell 18, an observation hole is formed in the top of the heat shielding shell 18, and an observation point in the center of sample 17 is observed through observation hole.

Symmetrical rectangular holes are formed in the heat shielding shell 18. The heat insulation insert board 19 passes through the two rectangular holes in turn and completes installation. A through hole is formed in the middle part of the heat insulation insert board 19. The infrared light path 59 of the infrared temperature measuring module reaches the sample 17 through the through hole to realize the temperature measurement of the sample 17.

The testing system includes a plurality of heat insulation insert boards 19, and the through holes in the heat insulation insert boards are all different in sizes.

Specifically, the heat shielding shell 18 is fixed on the base 66 by means of the heat shielding shell fixing plate 20. The heat shielding shell fixing plate 20 is placed right below the heat shielding insert boards 19 and is provided with a circular hole. The heat shielding shell fixing plate 20 is configured for fixing and supporting the heat shielding shell 18. First insulating blocks 51 are respectively arranged right below both ends of the heat shielding shell fixing plate 20, and both ends of the heat shielding shell fixing plate 20, the first insulating blocks 51 and base lugs are insulated and fixed by ceramic screws.

In the embodiment, the heat shielding shell 18 and the heat shielding shell fixing plate 20 are electrically insulated from the external equipment, so that the potential of the heat shielding shell 18 is suspended. When hot electrons overflow at the high temperature, bias voltages can be applied to the heat shielding shell 18 and the heat shielding shell fixing plate 20 to suppress hot electrons and achieve the effect of clear imaging at the high temperature by electric heating. Therefore, by setting the potential of the clamp, the metal sample 17 placed on the clamp is grounded, and the potential barrier of thermionic emission is improved. When the temperature of the sample 17 heated by current is higher, free electrons in the metal sample 17 gain more energy, and some electrons cross the potential barrier to become hot electrons. The hot electrons crossing the potential barrier can be further suppressed by means of negative bias voltages applied by the heat insulation shielding layer, thus achieving the purpose of multi-layer filtering of hot electrons.

In some embodiments, both ends of the eccentric shaft assembly are respectively provided with a first support frame 3 and a second support frame 5. Both ends of the eccentric shaft assembly are respectively rotatably connected to the first support frame 3 and the second support frame 5 at both ends of the eccentric shaft assembly through ordinary bearings.

In some embodiments, the sample is narrow in a middle section and wide in two side sections, and the middle section and the two side sections are provided with transition arcs, the sample is in the shape of similar dog bone, so that the heating effect of the middle section of the sample is more obvious. The resistance of the sample is less than that of any one of the lead screws arranged symmetrically, so as to avoid the current from flowing through the lead screws.

In some embodiments, the first transmission unit includes two first transmission gears 2. A motor shaft of the fatigue driving motor 1 extends through the first support frame 3. A pair of first transmission gears 2 meshed with each other are respectively fixedly connected to the motor shaft end of the fatigue driving motor 1 and a shaft end of the transmission shaft through keys. The rotation of the motor shaft of the fatigue driving motor 1 drives the first transmission gears 2 meshed with each other to rotate, thereby driving the rotation of the eccentric shaft assembly.

In some embodiments, one end of the first support frame 3 and one end of the second support frame 5 are fixedly provided with a first fixing beam 10. A sliding hole is formed in the middle part of the first fixing beam 10. A ring-shaped flange bushing is fixedly arranged in the sliding hole. One end of the connecting rod passes through the ring-shaped flange bushing and is horizontally movable in the ring-shaped flange bushing.

The first support frame 3, the second support frame 5 and the first fixing beams 10 constitute a rigid support frame of the fatigue driving module. The first fixing beam 10 is similar to an S-shaped block in shape. The upper end face of the S-shaped block is embedded with a circular flange bushing 9. The flange of the circular flange bushing 9 is connected with the first fixing beam 10 by screws. The circular flange bushing 9 is configured for supporting and guiding the connecting rod. The lower end face of the S-shaped block is a rectangular strip end face and abutted against one end face of the base 66 and fixed by a row of screws and open elastic gaskets. The rigid support frame of the fatigue driving module and the base 66 are convenient to disassemble and maintain, that is to say, the whole fatigue driving module can be modularistically installed and disassembled with the base 66, so that the development efficiency is improved and maintenance cost is decreased, the flexibility and portability are greatly improved, the functions of the fatigue driving module can be expanded and reduced according to the testing requirements and it can be installed and disassembled conveniently to meet the application of different testing scenarios.

In some embodiments, the insulating spacer at the pressure sensor 29 may be arranged in the following specific ways.

The translation beam 23 is horizontally arranged. The shaft section of the second lower clamping block 21 extends through the central circular hole of the translation beam 23, and the shaft section, closest to a clamp head, of the second lower clamping block 21 is a first shaft section, and the shaft sections are sequentially a second shaft section and a third shaft section from near to far.

The first shaft section is a shaft section matched with the central circular hole of the translation beam 23. Since the clamp need to be kept charged during heated at a high temperature for a long-time, a first electric insulation bushing 22 is sleeved on the first shaft section of the second lower clamping block 21 for electrically insulating the translation beam 23.

The second shaft section is provided with a second electric insulation bushing 30. The second electric insulation bushing 30 passes through the ceramic ring 31, the pressure sensor 29 and the sensor bushing 28 in turn from left to right. The sensor bushing 28 is disposed in a circular groove of the translation beam 23, and the bottom surface of the circular groove of the translation beam 23 serves as a top end, namely a right top end, when the sensor bushing 28 is pressed by force. The bottom surface of the circular groove of the translation beam 23 is also the right top end when the pressure sensor 29 is pressed by force. The fixing nut 32 is installed on the threaded shaft end of the second lower clamping block 21, which is the third shaft section of the second lower clamping block 21 and serves as the left top end of the ceramic ring 31. The pressure sensor 29 is placed between the ceramic ring 31 and the sensor bushing 28. The ceramic ring 31, the pressure sensor 29 and the sensor bushing 28 are sequentially pre-tightened by screwing the fixing nut 32 until the end face of the sensor bushing 28 abuts against the right top end.

The ceramic ring 31 is made of alumina ceramic, the sensor bushing 28 is made of 304 stainless steel, and the second electric insulation bushing 30 is made of high-temperature-resistant polyetheretherketone plastic. The first electric insulation bushing 22, the second electric insulation bushing 30, and the ceramic ring 31 are all made of electric insulation materials. On the premise of ensuring the normal operation of the pressure sensor 29, the pressure sensor 29 is prevented from being interfered by the signal of heating current, and stray current is prevented from flowing through the pressure sensor 29 to cause instability or failure.

On the premise of ensuring the normal operation of the pressure sensor 29, the contact surfaces of the pressure sensor 29 with the ceramic ring 31 and the sensor bushing 28 are designed to be in small-area contact, so as to increase the thermal resistance. The pressure sensor 29 is prevented from being damaged by thermal overshoot during long-term electric heating of the clamp.

In addition, the sensor bushing 28 is not completely embedded in the circular groove of the translation beam 23. When the sensor bushing 28 and the translation beam 23 are tightly attached, a short section of the sensor bushing 28 is extended to keep a certain gap between the end face of the pressure sensor 29 and the end face of the translation beam 23 adjacent the pressure sensor 29 whose purpose is to further insulate heat and electricity of the pressure sensor 29. Because the pressure sensor 29 is the most critical part for the long-term high-temperature force monitoring assembly, the above-mentioned design layout of thermal insulation and electric insulation is adopted. The reliable operation of the long-term high-temperature force monitoring assembly is ensured.

In actual operation, the sample 17 is placed on the knurling bosses of the lower clamps at the left and right ends, and then the knurling bosses of the upper clamping blocks are correspondingly pressed against the left and right ends of the sample 17. At the same time, the sample 17 is compacted and fixed by clamping screws. When the pre-tightening motor 33 drives the force to reach the two lead screws by means of the transmission system, the two lead screws for transmission rotate to drive the translation beam 23 to move linearly. When the translation beam 23 starts to move away from the first fixing beam 10, the sample 17 is pulled to the pre-tightening state. During the sample 17 is subjected from being clamped to being pre-tightened, the fixing nut 32 (the left top end) does not move, and the pressure sensor 29 is squeezed indirectly from the right top end, which directly indicates that the sensor bushing 28 squeezes the bearing surface of the pressure sensor 29 until the force signal of the pressure sensor 29 is output to an interface of the upper computer for display. During the pre-tightening of the sample 17, the translation beam 23 begins to move away from the first fixing beam 10. The long-striped grating ruler 43 with one end thereof installed at the lateral end of the translation beam 23 and the grating reading head fixing plate 44 with one end thereof installed at the lateral end of the first fixing beam 10 are relatively displaced. The generated relative displacement is captured by the reading head 45 installed on the grating reading head fixing plate 44, and the displacement amount during the stretching of the sample 17 by the clamps is fed back to the interface of the upper computer for display. In addition, in order to prevent the translation beam 23 from overshooting, a limiting switch 41 is installed on the fourth fixing mount 40.

Specific examples are used for illustration of the principles and implementation methods of the present disclosure. The description of the above-mentioned embodiments is used to help illustrate the method and its core principles of the present disclosure. In addition, those skilled in the art can make various modifications in the specific embodiments and scope of application in accordance with the teachings of the present disclosure. In conclusion, the content of this specification shall not be construed as a limitation to the present disclosure.

What is claimed is:

1. An in-situ testing system of metal materials under complex loads, comprising:
    a fatigue testing unit configured for pre-tightening a sample and then performing a fatigue testing on the sample;
    a loading unit configured for heating the sample;
    a signal detecting unit comprising a pressure sensor and a displacement sensor; the pressure sensor is configured for monitoring a tensile force to which the sample is subjected; the displacement sensor is configured for monitoring a displacement of the sample after being stretched during the pre-tightening of the sample; and a base configured for bearing the fatigue testing unit, the loading unit and the signal detecting unit; and the base is able to be positioned on a scanning electron microscope stage or an open microscopic device, wherein:

the fatigue testing unit comprises a sample clamping unit, a fatigue driving module and a mechanical pre-tightening unit;

the sample clamping unit comprises a first clamping unit and a second clamping unit, the first clamping unit is configured for clamping a first end of the sample, and the second clamping unit is configured for clamping a second end of the sample;

the fatigue driving module comprises a fatigue driving motor, a first transmission unit, an eccentric shaft assembly, a connecting rod and a bearing, the eccentric shaft assembly is rotatably arranged on the base, the fatigue driving motor is able to drive the eccentric shaft assembly to rotate through the first transmission unit, the first clamping unit is movably arranged on the base in a telescopic direction of the sample, a first end of the connecting rod is rotatably connected with an eccentric shaft section of the eccentric shaft assembly through the bearing, and a second end of the connecting rod is rotatably connected with the first clamping unit; and the mechanical pre-tightening unit comprises a translation beam, a lead screw and a lead screw driving assembly, the translation beam is fixedly connected with the second clamping unit, the lead screw is rotatably installed on the base, the lead screw is in threaded connection with the translation beam, the lead screw driving assembly is fixed on the base, and the lead screw driving assembly is configured for driving the lead screw to rotate.

2. The in-situ testing system of metal materials under complex loads according to claim 1, wherein:

the lead screw driving assembly comprises a transmission worm gear-worm device, a worm fixing shaft and a pre-tightening motor, the transmission worm gear-worm device comprises a worm gear and a worm, the worm gear is coaxially fixed with the lead screw, the worm is coaxially fixed with the worm fixing shaft, the worm gear is meshed with the worm, the worm fixing shaft is rotatably installed on the base, the pre-tightening motor is fixed on the base, and the worm fixing shaft is in transmission connection with an output shaft of the pre-tightening motor;

the lead screw comprises two lead screws, the two lead screws are respectively located on two sides of the sample clamping unit and symmetrically arranged, the translation beam is in threaded connection with the two lead screws simultaneously; the transmission worm gear-worm device comprises two transmission worm gear-worm devices, and the worm fixing shaft is respectively in transmission connection with the two lead screws through the two transmission worm gear-worm devices; and the pre-tightening motor and the fatigue driving motor are both arranged perpendicular to and away from the sample.

3. The in-situ testing system of metal materials under complex loads according to claim 2, wherein:

the first clamping unit comprises a first upper clamping block, a first lower clamping block and a first clamping screw, the first upper clamping block is fixedly connected with the first lower clamping block through the first clamping screw, an upper surface of the first lower clamping block is provided with a first knurling boss, the first upper clamping block is arranged above the first knurling boss, the first upper clamping block is also provided with a knurling boss opposite to the first knurling boss, and the first upper clamping block and the first lower clamping block are configured for clamping the first end of the sample;

the second clamping unit comprises a second upper clamping block, a second lower clamping block and a second clamping screw, the second upper clamping block is fixedly connected with the second lower clamping block through the second clamping screw, an upper surface of the second lower clamping block is provided with a second knurling boss, the second upper clamping block is also provided with a knurling boss opposite to the second knurling boss, the second upper clamping block is arranged above the second knurling boss, and the second upper clamping block and the second lower clamping block are configured for clamping the second end of the sample; and first positioning holes are respectively formed in geometric centers of the first knurling boss and the second knurling boss, second positioning holes corresponding to the first positioning holes are formed in the first upper clamping block and the second upper clamping block, positioning pins are able to be inserted into the first positioning holes and the second positioning holes, and a middle part of each of the positioning pins passes through a corresponding one of the first end and the second end of the sample.

4. The in-situ testing system of metal materials under complex loads according to claim 3, wherein:

the loading unit comprises a heating power supply, the first clamping unit, the second clamping unit and the sample are all conductive, the heating power supply energizes the sample through the first clamping unit to realize self-heating of the sample, the first clamping unit is a negative electrode, the second clamping unit is a positive electrode, and the first clamping unit is grounded;

a screw rod is fixedly arranged on a side, away from the first lower clamping block, of the second lower clamping block, the screw rod extends through the translation beam, an end of the screw rod is in threaded connection with a fixing nut, the pressure sensor is arranged between the fixing nut and the translation beam, insulating spacers are arranged between the pressure sensor and each of the second clamping unit, the translation beam and the fixing nut; the pressure sensor and the insulating spacers on both sides of the pressure sensor are able to be clamped between the fixing nut and the translation beam by screwing the fixing nut;

a water-cooling assembly and a ceramic plate are also provided, wherein the water-cooling assembly abuts against one side of the ceramic plate, another side of the ceramic plate abuts against the translation beam, and the water-cooling assembly is configured for cooling the translation beam; and the sample is narrow in a middle section and wide in two side sections, the middle section and the two side sections are provided with transition arcs, and a resistance of the sample is less than that of any one of the lead screws arranged symmetrically.

5. The in-situ testing system of metal materials under complex loads according to claim 1, wherein;

the eccentric shaft assembly comprises an eccentric shaft body and an eccentric bushing, the eccentric shaft body is provided with two eccentric shaft sections, geometric center lines of the two eccentric shaft sections are coincident, one eccentric shaft section with a circular section is a first eccentric shaft section, and another eccentric shaft section with a regular polygon section is a second eccentric shaft section;

the first eccentric shaft section is sleeved with the eccentric bushing, and the eccentric bushing is rotatable relative to the eccentric shaft body to realize adjustment of a total eccentric amount;

one end of the eccentric bushing is provided with a fixing sleeve, the fixing sleeve is sleeved on the second eccentric shaft section, a first threaded hole is formed in each of surfaces of the second eccentric shaft section, a second threaded hole is formed in the fixing sleeve, and the fixing sleeve is fixed on the second eccentric shaft section through screws; alternatively, a second threaded hole is fixed in the fixing sleeve only, and the fixing sleeve is fixed by screwing a jackscrew into the second threaded hole; and the bearing is an eccentric bearing, and the connecting rod is connected to an outer ring of the eccentric bearing through an opening and closing clasp ring.

6. The in-situ testing system of metal materials under complex loads according to claim 1, wherein;

the displacement sensor is a grating displacement sensor, the grating displacement sensor comprises a reading head and a grating ruler, the reading head is fixed on a grating reading head fixing plate, one end of the grating reading head fixing plate is fixed on the translation beam, and the grating ruler is fixed on the base; alternatively, the reading head is fixed on the base, and the grating ruler is fixed on the translation beam.

7. The in-situ testing system of metal materials under complex loads according to claim 1, also comprising an infrared temperature measuring module, wherein:

the infrared temperature measuring module is configured for measuring a temperature at a central observation point of the sample;

the infrared temperature measuring module comprises an infrared temperature measuring probe and a three-way moving platform, the infrared temperature measuring probe is fixedly arranged on a moving end of the three-way moving platform, and the three-way moving platform is configured to drive the infrared temperature measuring probe to move in three directions; the infrared temperature measuring module is arranged right below the sample, and the infrared temperature measuring probe is able to directly face the sample to receive an infrared signal radiated by the sample or is able to receive an infrared signal radiated by the sample after being reflected by a plurality of reflectors;

before the fatigue testing, the infrared temperature measuring module and a thermocouple are respectively used to measure a temperature of a metal sheet sample under a vacuum environment and then the temperature measured by the thermocouple is compared with the temperature measured by the infrared temperature measuring module, and an emission coefficient of the infrared temperature measuring module is adjusted according to temperature comparison data to a value equal to a measured value of the thermocouple, adjusted emission coefficients of the infrared temperature measuring module at different temperatures are recorded;

carrying out an experiment on metal sheet samples processed under a same processing technology, wherein before carrying out the experiment, previously setting the emission coefficient adjusted and recorded under a designated experimental temperature for the metal sheet samples, and then increasing current on the metal sheet samples so that a temperature of the metal sheet samples reaches the designated experimental temperature, and the experiment is carried out at the designated experimental temperature stabilized by a Proportional-Integral-Derivative (PID) control.

8. The in-situ testing system of metal materials under complex loads according to claim 7, also comprising a heat shielding shell and a heat insulation insert board, wherein:

the sample is covered with the heat shielding shell, an observation hole is formed in a top of the heat shielding shell, and the center observation point of the sample is observed through the observation hole;

symmetrical rectangular holes are formed in the heat shielding shell, the heat insulation insert board passes through the two rectangular holes in turn and completes installation thereof, a through hole is formed in middle part of the heat insulation insert board, and an infrared light path of the infrared temperature measuring module reaches the sample through the through hole to realize temperature measurement of the sample;

the heat insulation insert board comprises a plurality of heat insulation insert boards, and through holes in the heat insulation insert boards are all different in sizes; and the heat shielding shell, the heat insulation insert boards and a heat shielding shell fixing plate are all conductors and communicated with each other, the heat shielding shell, the heat insulation insert boards and the heat shielding shell fixing plate are all electrically insulated from external equipment, and bias voltages are able to be applied to the heat shielding shell, the heat insulation insert boards and the heat shielding shell fixing plate to suppress hot electrons.

9. The in-situ testing system of metal materials under complex loads according to claim 1, wherein four legs are arranged at a bottom of the base, the base is rectangular and provided with a hollow middle part, leveling fixing strips for height adjustment are installed on two opposite sides of an upper end face of the base, and a countersunk hole configured for being connected to the scanning electron microscope stage or a platform of the open microscopic device is formed in each of the four legs.

* * * * *